(No Model.)

F. WHITE.
VACUUM HOOK.

No. 398,679. Patented Feb. 26, 1889.

WITNESSES.
Philip Emerson.
N. C. Ramsay.

INVENTOR.
Frank White
by Wright Brown Crossley
Attys.

UNITED STATES PATENT OFFICE.

FRANK WHITE, OF PHILADELPHIA, PENNSYLVANIA, ASSIGNOR TO PHILIP W. PRATT, OF BOSTON, MASSACHUSETTS.

VACUUM-HOOK.

SPECIFICATION forming part of Letters Patent No. 398,679, dated February 26, 1889.

Application filed October 3, 1887. Serial No. 251,376. (No model.)

*To all whom it may concern:*

Be it known that I, FRANK WHITE, a citizen of the United States, residing at Philadelphia, in the county of Philadelphia and State of Pennsylvania, have invented a new and useful improvement in vacuum hooks, knobs, and pins by means of concavo-convex india-rubber disks for adhering to smooth solid surfaces by vacuum with a brass-wire spiral disk molded in the apex, which can be used as a shank or hook, which improvement is fully set forth in the following specification, reference being had to the accompanying drawings.

This invention has for its object to provide improved means whereby a hook, knob, or like supporting device may be secured to a supporting-surface by atmospheric pressure; and it consists in the combination, with a hook or its equivalent, as a knob, of a cup or holder attached to the hook and composed of elastic or yielding material, as india-rubber, said cup or holder having certain peculiarities of form, hereinafter described, whereby when it is pressed against a smooth air-tight surface a vacuum will be formed and the holder will be held by atmospheric pressure against said surface.

Figure 1:
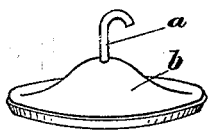
Figure 2:
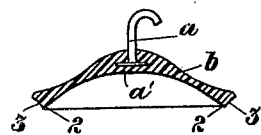
Figure 3:

Of the accompanying drawings, forming a part of this specification, Figure 1 represents a perspective view of my improved vacuum-hook. Fig. 2 represents a sectional view of the same. Fig. 3 represents a perspective view of the hook without its holder.

The same letters of reference indicate the same parts in all the figures.

In the drawings, *a* represents a metal hook, and *b* represents a cup or holder of yielding or elastic material, preferably india-rubber. Said cup or holder is of generally concavo-convex form, the hook projecting from the convex side. The opposite or concave side of the holder is bounded by a marginal lip, which has a beveled inner side, 2, and an outer side, 3, said sides 2 and 3 forming an acute angle at their meeting point.

In attaching the hook to a smooth surface the acute-angled lip or margin of the holder is placed on said surface, and the central part of the holder is pressed inwardly, thereby expelling a portion of the air from between the said surface and the concave side of the holder and at the same time flattening the beveled side 2 of the marginal lip upon said surface, so that instead of the narrow bearing afforded by the acute angle of said lip upon the supporting-surface the entire beveled side 2 is utilized as a bearing, which is kept in firm contact with the supporting-surface by atmospheric pressure, the wide bearing of the marginal lip on the supporting-surface preventing the admission of air between the holder and the supporting-surface.

The hook *a* is attached to the holder by having the inner end of its shank embedded in the central portion of the holder between the inner and outer surfaces thereof, the inner surface of the holder being imperforate, so that there is no seam or crevice therein for the admission of air. The inner end of the hook is provided with a flange or enlargement, *a'*, which is embedded in the central portion of the holder, said portion being thickened to provide sufficient material on each side of said head and to give the holder sufficient resilience or elasticity.

The shank-head may have holes formed in it to enable the rubber to the more securely engage and hold said head.

It will be seen that the V-shaped marginal lip, reduced to an acute angle at its lower or bearing edge, is enabled by said acute-angled edge to conform closely to any slight undulations or unevenness in the surface to which the holder is applied. The holder is made thickest at its central portion, as already stated, and the margin is thickened by the marginal lip, which, when the central portion of the holder is pressed inwardly, gives the outer surface an annular depression between its center and margin. Said depression, as I believe, holds the atmosphere and enables it to press the holder more firmly against its seat than would be the case if the outer surface did not have said annular recess.

I claim—

The combination of a metallic shank having a flange or enlargement at its inner end and suspensory device at its outer end, with a concavo-convex elastic holder having a thickened central portion in which the flange or enlargement of the said shank is embedded between the inner and outer surfaces of the holder, and an acute-angled marginal lip on its concave side, said lip having a beveled inner side which forms a flat bearing-surface when the holder is pressed inwardly, the thickness of the lip forming a depression in the outer surface of the holder when the latter is pressed against its seat, as set forth.

FRANK WHITE.

Witnesses:
EDWARD STROHMANN,
THOMAS B. PARKE.